United States Patent
Kemp et al.

[11] Patent Number: 5,897,902
[45] Date of Patent: Apr. 27, 1999

[54] PROCESS FOR PREPARING REFRIGERATED RICE MEALS

[75] Inventors: Louis E. Kemp, Los Angeles, Calif.; Kevin J. Hopkins, Superior, Wis.

[73] Assignee: Ready Foods International, Inc., Duluth, Minn.

[21] Appl. No.: 08/807,797

[22] Filed: Feb. 28, 1997

[51] Int. Cl.$^6$ ........................................ A23L 3/10
[52] U.S. Cl. ...................... 426/412; 426/549; 426/106; 426/302; 426/521; 426/524
[58] Field of Search ..................... 426/412, 442, 426/549, 106, 302, 321, 324, 325, 327, 521, 524, 550

[56] References Cited

U.S. PATENT DOCUMENTS

| | | | |
|---|---|---|---|
| 4,097,612 | 6/1978 | Powrie et al. | 426/269 |
| 4,228,196 | 10/1980 | Weaver et al. | 426/407 |
| 4,505,937 | 3/1985 | Demeulemeester et al. | 426/8 |
| 4,597,976 | 7/1986 | Doster et al. | 426/325 |
| 4,734,291 | 3/1988 | Raffensperger | 426/325 |
| 4,876,104 | 10/1989 | McGuire et al. | 426/57 |
| 4,957,761 | 9/1990 | Hale | 426/410 |
| 5,034,235 | 7/1991 | Dunn et al. | 426/238 |
| 5,229,154 | 7/1993 | Street | 426/392 |
| 5,308,632 | 5/1994 | Howard et al. | 426/412 X |
| 5,312,639 | 5/1994 | Howard et al. | 426/575 |
| 5,332,587 | 7/1994 | Howard et al. | 426/128 |
| 5,447,734 | 9/1995 | Street | 426/268 |
| 5,562,938 | 10/1996 | Lee et al. | 426/412 X |

*Primary Examiner*—Milton Cano
*Attorney, Agent, or Firm*—Kinney & Lange, P.A.

[57] ABSTRACT

A process for preparing a refrigerated rice meal. The process includes mixing cooked rice with oil to form a rice mixture. The rice mixture is packaged in a hermetically sealed container to form a packaged rice meal. The packaged rice meal is heated to a temperature of greater than 165° F. The packaged rice meal is cooled to a temperature of less than about 41° F. The packaged rice meal produced according to the present invention has a shelf life of at least 90 days when the packaged rice meal is maintained at a temperature of less than about 41° F.

23 Claims, No Drawings

PROCESS FOR PREPARING REFRIGERATED RICE MEALS

BACKGROUND OF THE INVENTION

The present invention relates generally to a process for producing prepared foods. More particularly, the present invention relates to a process for preparing refrigerated rice meals.

Meals that reduce the preparation time prior to consumption are becoming increasingly popular with consumers. While consumers desire the convenience of prepared meals, consumers also desire prepared meals to exhibit taste and appearance characteristics that are similar to homemade meals.

Prepared meals typically contain one or more of the following food components: meat, vegetables, starches, and sauces. For example, consumers expect meat to be tender, vegetables to be crisp, and starches to be firm and flaky and not clumpy.

To maintain the prepared meals with a desired quality until the prepared meals are consumed, prepared meals are typically frozen during the manufacturing process. The prepared meals are then maintained frozen until it is desired to heat the prepared meal for consumption.

Frozen prepared meals are typically thawed and heated using a microwave oven. The frozen prepared meals thereby provide consumers with the ability to quickly prepare meals while minimizing the effort that must be expended to prepare the meals.

In spite of the fact that frozen prepared meals can be stored for extended periods of time without experiencing a decrease in taste and appearance characteristics, frozen prepared meals are typically believed to have inferior taste and appearance characteristics to prepared meals that are distributed and displayed in a refrigerated state.

Various types of pasta and meat prepared meals have been developed to be marketed in a refrigerated state. For example, "fresh" pasta typically exhibits superior taste and appearance characteristics to dried pasta. Similarly, rotisserie-style chicken, which is commonly prepared in a store where the rotisserie-style chicken is sold, has superior taste and appearance characteristics to chicken in frozen prepared meals. Additionally, both "fresh" pasta and rotisserie-style chicken allow consumers to reduce the time needed to prepare the meals when compared to the other listed alternatives.

One typical drawback of prior art refrigerated prepared meals is that these prepared meals have a limited shelf life that is typically less than 90 days. Consumers are reluctant to purchase refrigerated prepared meals where a longer shelf life is obtained through the addition of preservatives to the prepared meals because of potential health risks of consuming large amounts of preservatives over extended time periods.

One way to enhance the shelf life of prepared meals that are distributed and displayed in a refrigerated state is to process the prepared meals to reduce the amount of oxygen within the package. One common way of reducing the oxygen with the package is to purge with an inert gas, such as nitrogen.

SUMMARY OF THE INVENTION

The present invention includes a process for preparing a refrigerated rice meal. The process includes mixing cooked rice with oil to form a rice mixture. The process also includes packaging the rice mixture in a hermetically sealed container to form a packaged rice meal.

The packaged rice meal is then heated to a temperature of greater than 165° F. Next, the packaged rice meal is cooled to a temperature of less than about 41° F. The packaged rice meal has a shelf life of at least 90 days when the packaged rice meal is maintained at a temperature of less than about 41°F.

DETAILED DESCRIPTION OF THE PREFERRED EMBODIMENTS

A process according to the present invention allows a packaged rice meal to be prepared so that the packaged rice meal has a shelf life of at least 90 days when the packaged rice meal is maintained at a conventional refrigerator temperature of less about 41° F.

Because the packaged rice meal of the present invention is maintained in a refrigerated state, the taste and appearance characteristics of the rice meal are superior to frozen packaged meals. Additionally, displaying the packaged rice meal in a refrigerated state allows a consumer to obtain a better idea of what the rice meal looks like than is possible with frozen packaged meals. Because of these benefits of rice meals prepared according to the present invention, consumers have a greater perceived value of packaged rice meals made according to the present invention than frozen packaged meals.

A major portion of the prepared meal is preferably a starch component. The starch component used with the present invention is preferably white rice, wild rice, pasta, or combinations thereof.

As an initial step in preparing the prepared meal of the present invention, the rice is substantially cooked. A person of ordinary skill in the art will appreciate that there are a variety of ways for cooking the rice.

After cooling the cooked rice to approximately room temperature, the cooked rice and oil are mixed together. The oil is used at a concentration of up to about 5 percent by weight of the cooked rice oil. Preferably, the oil is added at a concentration of between about 1.5 and 2.5 percent. Mixing the cooked rice and the oil causes the oil to substantially coat the rice. The oil is preferably soybean oil or olive oil. However, other types of oil are also suitable for use with the process of the present invention.

Depending on the type of prepared meal being manufactured, spices, herbs, and other flavorings, which provide the prepared meal with a desired flavor, are added to the rice mixture. For example, when preparing Spanish rice, saffron is used.

It is also possible to mix other additional ingredients in the rice mixture depending on the desired components in the prepared meal. Examples of additional ingredients that are suitable for use with the present invention include meat, vegetables, and sauce. The additional ingredients are preferably a minor portion of the prepared meal.

Suitable meats use with the present invention include beef, pork, chicken, and fish. Prior to mixing with the rice mixture, the meat is preferably cut into pieces having dimensions of less than about 1 inch and preferably less than about ½ of an inch. The meat is also preferably substantially cooked before mixing with the rice mixture.

Vegetables that are particularly suited for use with the present invention include beans, broccoli, cauliflower, cabbage, carrots, celery, corn, onions, peas, water chestnuts, green peppers, red peppers, and yellow peppers. The vegetables are preferably cut into pieces having dimensions of less than about 1 inch and preferably less than about ½ of an inch prior to mixing the vegetables with the rice mixture.

Depending on the vegetables selected for use with the present invention and the size into which the vegetables are cut, it is typically not desirable to cook the vegetables prior to incorporating the vegetables into the rice mixture. Other portions of the process of the present invention are typically sufficient to cook the vegetables to a desired extent so that the vegetables remain crisp and flavorful when consumed.

After all of the ingredients are mixed into the rice mixture, the rice mixture is placed into a plastic bag. The plastic bag is then hermetically sealed. The plastic bag used in conjunction with the present invention preferably has a multiple layer construction to prevent flavors from the rice mixture from leaching through the plastic bag. The plastic bag also prevents chemicals from passing through the plastic bag and into the rice mixture.

To enhance the ability to work with the plastic bag, the plastic is selected so that the plastic bag may be hermetically sealed using conventional heat sealing equipment. Additionally, the plastic bag is selected to withstand temperatures of between about 0° F. and 200° F. without experiencing a decrease in structural integrity. One preferred plastic used is fabricating the plastic bag is polyethylene.

Each plastic bag is preferably selected with a size that approximately corresponds with a size of the rice meal that is to be packaged. For example, when the packaged rice meal is desired to be a side dish, the rice meal typically is selected with a weight of between about 5 and 16 ounces. When the packaged rice meal is desired to be a main course, the rice meal is selected with a weight of between about 10 and 20 ounces.

To further enhance the appeal of the packaged rice meal of the present invention, the plastic bag preferably has clear portions that allow consumers to view the rice meal while the rice meal is displayed prior to purchase. Other portions of the plastic bag may be imprinted with a name of the distributor, a trademark under which the packaged rice meal is marketed, preparation instructions, and a list of ingredients in the rice meal. These other portions of the plastic bag may be clear, opaque, colored, or a combination thereof.

The packaged rice meal is then heated to a temperature of at least about 165° F. Once the rice meal attains a core temperature of at least 165° F., the packaged rice meal is maintained at the temperature for a period of at least 20 minutes. Preferably, the packaged rice maintained at a temperature of at least 165° F. for about 30 minutes. Heating for this duration kills bacteria present in the packaged rice meal. Preferably, the packaged rice meal is maintained at a temperature of between about 170° F. and 175° F. for about 20 minutes.

To ensure even and thorough heating of the packaged rice meal, heating is preferably accomplished by placing the packaged rice meal in a hot water having a desired temperature. A person of ordinary skill in the art will appreciate that there are alternative ways for heating the packaged rice meal.

An advantage of using the hot water bath is that the hot water bath allows the packaged rice meal to be rapidly heated to the desired temperature. Rapidly heating the packaged rice meal minimizes the production of off-flavors in the rice meal.

The packaged rice meal is then cooled to a temperature of less than about 41° F. Preferably, the packaged rice meal is maintained at a temperature of between about 32° F. and 41° F., which is similar to temperatures typically found in a refrigerator. Cooling the packaged rice meal is preferably accomplished by placing the packaged rice meal in a cool water bath.

The packaged rice meal is maintained at a temperature of less than about 41° F. during distribution and display prior to consumption. The process of the present invention enables the packaged rice meal to be maintained under these refrigerated conditions for at least 90 days without the packaged rice meal experiencing a decrease in quality.

When it is desired to consume the packaged rice meal, at least one small slit is made in the plastic bag of the packaged rice meal and the packaged rice meal is heated in a microwave oven. For most combinations of rice, meat, vegetables, and sauces used in preparing the packaged rice meal, heating the packaged rice meal in a microwave oven for between about 1.5 and 2 minutes is sufficient for packaged rice meal to attain a desired temperature for consumption.

The plastic bag is then cut open and the rice meal is removed from the plastic bag and placed onto a serving dish. The rice is firm and flaky and not dry or clumpy. Additionally, the meat is tendered and the vegetables are crisp.

Although the present invention has been described with reference to preferred embodiments, workers skilled in the art will recognize that changes may be made in form and detail without departing from the spirit and scope of the invention.

What is claimed is:

1. A process for preparing a refrigerated rice meal, the process comprising the steps of:
    mixing a previously cooked, cooled rice component with oil to form a rice mixture;
    packaging the rice mixture in a hermetically sealed container to form a packaged rice meal;
    heating the rice meal to a temperature greater than 165° F. for a period of at least about 20 minutes; and
    cooling the packaged rice meal to a temperature of less than about 41° F. but greater than about 32° F. and, wherein the packaged rice meal has a shelf life of at least 90 days when maintained at a temperature of less than about 41° F. but above about 32° F.

2. The process of claim 1, wherein the rice component includes white rice, wild rice, or combinations thereof.

3. The process of claim 1, wherein the oil is mixed with the rice component at a concentration of between about 1.5 and 2.5 percent by weight of the starch component.

4. The process of claim 1, wherein the oil includes soybean oil, olive oil, or combinations thereof.

5. The process of claim 1, and further comprising mixing meat, vegetables, sauces or combinations thereof into the rice mixture.

6. The process of claim 5, wherein the meat comprises beef, pork, chicken, fish, or combinations thereof.

7. The process of claim 5, wherein vegetables comprise beans, broccoli, cauliflower, cabbage, carrots, celery, corn, onions, peas, water chestnuts, green peppers, red peppers, yellow peppers, or combinations thereof.

8. The process of claim 5, and further comprising mixing herbs, spices, and flavorings with the rice mixture.

9. The process of claim 1, wherein the packaged meal is maintained at a core temperature of between about 170° F. and 175° F. for about 30 minutes.

10. The process of claim 9, wherein the packaged meal is heated by placing the packaged meal in a hot water bath.

11. The process of claim 1, wherein the packaged meal is cooled to a temperature between about 32° F. and 41° F.

12. The process of claim 1, and further comprising heating the packaged meal to a consumption temperature.

13. The process of claim 12, wherein the packaged meal is heated in a microwave oven for between about 1.5 minutes and 2 minutes.

14. A process for preparing a refrigerated rice meal, the process comprising the steps of:

mixing previously cooked, cooled rice with oil to form a rice mixture;

packaging the rice mixture in a hermetically sealed container to form a packaged rice meal;

heating the rice mixture to a temperature of between about 170° F. and 175° F. for about 20 minutes; and cooling the packaged rice meal to a temperature of between about 32° F. and 41° F., wherein the packaged rice meal has a shelf life of at least 90 days when maintained at a temperature of between 32° F. and 41° F.

15. The process of claim 15, wherein the rice includes white rice, wild rice, or combinations thereof.

16. The process of claim 14, wherein the oil is mixed with the rice at a concentration of between about 1.5 and 2.5 percent by weight of the rice.

17. The process of claim 14, wherein the oil includes soybean oil, olive oil, or combinations thereof.

18. The process of claim 14, and further comprising mixing meat, vegetables, sauces or combinations thereof into the rice mixture.

19. The process of claim 18, wherein the meat comprises beef, pork, chicken, fish, or combinations thereof.

20. The process of claim 18, wherein vegetables comprise beans, broccoli, cauliflower, cabbage, carrots, celery, corn, onions, peas, water chestnuts, green peppers, red peppers, yellow peppers, or combinations thereof.

21. The process of claim 18, and further comprising mixing herbs, spices, and flavorings with the rice mixture.

22. The process of claim 14, and further comprising heating the packaged rice meal to a consumption temperature.

23. The process of claim 22, wherein the packaged rice meal is heated in a microwave oven for between about 1.5 minutes and 2 minutes.

* * * * *